US007382287B1

(12) United States Patent
Chen et al.

(10) Patent No.: US 7,382,287 B1
(45) Date of Patent: Jun. 3, 2008

(54) AVIONICS SYSTEM, METHOD AND APPARATUS FOR SELECTING A RUNWAY

(75) Inventors: Susan S. Chen, Chandler, AZ (US); Clayton E. Barber, Independence, MO (US)

(73) Assignee: Garmin International, Inc, Olathe, KS (US)

( * ) Notice: Subject to any disclaimer, the term of this patent is extended or adjusted under 35 U.S.C. 154(b) by 295 days.

(21) Appl. No.: 10/453,371

(22) Filed: Jun. 3, 2003

(51) Int. Cl.
*G01C 21/00* (2006.01)

(52) U.S. Cl. ...................... 340/972; 340/947; 340/951; 701/16; 244/183

(58) Field of Classification Search ................ 340/972, 340/951, 947, 960, 988, 979, 945, 970; 701/16, 701/18; 244/75.1, 76 R, 114 R, 183
See application file for complete search history.

(56) References Cited

U.S. PATENT DOCUMENTS

| | | | | |
|---|---|---|---|---|
| 3,668,623 | A | 6/1972 | Csaposs | |
| 4,071,843 | A | 1/1978 | Marien | 343/5 |
| 4,224,669 | A | 9/1980 | Brame | 264/433 |
| 4,319,218 | A | 3/1982 | Bateman | 340/27 |
| 4,433,323 | A | 2/1984 | Grove | 340/970 |
| 4,484,192 | A | 11/1984 | Seitz et al. | 340/995 |
| 4,495,483 | A | 1/1985 | Bateman | 340/970 |
| 4,567,883 | A | 2/1986 | Langer et al. | 128/696 |
| 4,639,730 | A | 1/1987 | Paterson et al. | 340/970 |
| 4,646,244 | A | 2/1987 | Bateman et al. | 364/461 |
| 4,675,823 | A | 6/1987 | Noland | 364/460 |
| 4,684,948 | A | 8/1987 | Bateman | 340/970 |
| 4,792,799 | A | 12/1988 | Grove | 340/970 |
| 4,818,992 | A | 4/1989 | Paterson | 340/970 |
| 4,849,756 | A | 7/1989 | Bateman | 340/970 |
| 4,857,923 | A | 8/1989 | Bateman | 340/970 |
| 4,894,655 | A | 1/1990 | Joguet et al. | 340/988 |
| 4,903,212 | A | 2/1990 | Yokouchi et al. | 364/449 |
| 4,914,436 | A | 4/1990 | Bateman et al. | 340/970 |
| 4,916,448 | A | 4/1990 | Thor | 340/970 |
| 4,939,513 | A | 7/1990 | Paterson et al. | 340/970 |
| 4,940,987 | A | 7/1990 | Frederick | 342/26 |
| 4,951,047 | A | 8/1990 | Paterson et al. | 340/970 |
| 4,980,684 | A | 12/1990 | Paterson et al. | 340/970 |
| 4,987,413 | A | 1/1991 | Grove | 340/970 |
| 5,001,476 | A | 3/1991 | Vermilion et al. | 340/970 |
| 5,038,141 | A | 8/1991 | Grove | 340/970 |
| 5,075,685 | A | 12/1991 | Vermilion et al. | 340/970 |
| 5,086,396 | A | 2/1992 | Waruszewski, Jr. | 364/454 |
| 5,136,512 | A | 8/1992 | Le Borne | 364/461 |
| 5,140,532 | A | 8/1992 | Beckwith, Jr. et al. | 395/101 |
| 5,153,588 | A | 10/1992 | Muller | 340/968 |

(Continued)

*Primary Examiner*—Davetta W. Goins
(74) *Attorney, Agent, or Firm*—Kevin E. West; Samuel M. Karte

(57) ABSTRACT

A destination runway selection method, system and apparatus for use with a Terrain Awareness and Warning System ("TAWS"). The method involves determining upon which of a number of candidate runways an aircraft is most likely to land so that appropriate Required Terrain Clearance ("RTC") values and other alert thresholds may be referenced. According to a first aspect of the method, a destination airport is initially selected from among candidate airports. According to a second aspect of the method, a destination runway is selected from among the candidate runways at the destination airport. In one particular embodiment of the invention, the candidate runway is selected solely on the basis of distance calculations between the runway and the aircraft.

27 Claims, 2 Drawing Sheets

U.S. PATENT DOCUMENTS

| | | | | |
|---|---|---|---|---|
| 5,166,682 | A | 11/1992 | Bateman | 340/970 |
| 5,187,478 | A | 2/1993 | Grove | 340/970 |
| 5,192,208 | A | 3/1993 | Ferguson et al. | 434/2 |
| 5,196,847 | A | 3/1993 | Bateman | 340/970 |
| 5,202,690 | A | 4/1993 | Frederick | 342/26 |
| 5,220,322 | A | 6/1993 | Bateman et al. | 340/970 |
| 5,265,025 | A | 11/1993 | Hirata | 364/449 |
| 5,293,318 | A | 3/1994 | Fukushima | 364/449 |
| 5,369,589 | A | 11/1994 | Steiner | 364/449 |
| 5,392,048 | A | 2/1995 | Michie | 342/26 |
| 5,410,317 | A | 4/1995 | Ostrom et al. | 342/65 |
| 5,414,631 | A | 5/1995 | Denoize et al. | 364/461 |
| 5,420,582 | A | 5/1995 | Kubbat et al. | 340/974 |
| 5,442,556 | A | 8/1995 | Boyes et al. | 364/433 |
| 5,448,233 | A | 9/1995 | Saban et al. | 340/963 |
| 5,448,241 | A | 9/1995 | Zeoli et al. | 342/25 |
| 5,485,156 | A | 1/1996 | Manseur et al. | 342/77 |
| 5,488,563 | A | 1/1996 | Chazelle et al. | 364/461 |
| 5,495,249 | A | 2/1996 | Chazelle et al. | 342/36 |
| 5,519,392 | A | 5/1996 | Oder et al. | 340/995 |
| 5,638,282 | A | 6/1997 | Chazelle et al. | 364/461 |
| 5,661,486 | A | 8/1997 | Faivre et al. | 342/33 |
| 5,677,842 | A | 10/1997 | Denoize et al. | 364/461 |
| 5,781,126 | A | 7/1998 | Peterson et al. | 340/970 |
| 5,798,712 | A | 8/1998 | Coquin | 340/970 |
| 5,839,080 | A | 11/1998 | Muller et al. | 701/9 |
| 5,884,223 | A | 3/1999 | Tognazzini | 701/301 |
| 5,936,552 | A | 8/1999 | Wichgers et al. | 340/963 |
| 5,991,460 | A * | 11/1999 | Mitchell | 382/278 |
| 6,002,347 | A | 12/1999 | Daly et al. | 340/963 |
| 6,038,498 | A | 3/2000 | Briffe et al. | 701/3 |
| 6,043,758 | A | 3/2000 | Snyder, Jr. et al. | 340/970 |
| 6,076,042 | A | 6/2000 | Tognazzini | 701/301 |
| 6,088,634 | A | 7/2000 | Muller et al. | 701/9 |
| 6,088,654 | A | 7/2000 | Lepere et al. | 701/301 |
| 6,092,009 | A | 7/2000 | Glover | 701/14 |
| 6,122,570 | A | 9/2000 | Muller et al. | 701/9 |
| 6,127,944 | A | 10/2000 | Daly et al. | 340/963 |
| 6,138,060 | A | 10/2000 | Conner et al. | 701/9 |
| 6,216,064 | B1 | 4/2001 | Johnson et al. | 701/4 |
| 6,219,592 | B1 | 4/2001 | Muller et al. | 701/9 |
| 6,233,522 | B1 | 5/2001 | Morci | 701/208 |
| 6,304,800 | B1 | 10/2001 | Ishihara et al. | 701/16 |
| 6,489,916 | B2 | 12/2002 | Block | 342/65 |
| 6,711,479 | B1 * | 3/2004 | Staggs | 701/16 |
| 2001/0056316 | A1 | 12/2001 | Johnson et al. | 701/14 |
| 2002/0089432 | A1 | 7/2002 | Staggs et al. | 340/945 |

* cited by examiner

AVIONICS SYSTEM, METHOD AND APPARATUS FOR SELECTING A RUNWAY

BACKGROUND OF THE INVENTION

1. Technical Field

The present invention generally relates to identifying destination runways for use with a Terrain Awareness Warning System for use by an aircraft for adjusting aircraft terrain clearance alert values during a landing pattern of the aircraft.

2. Background Art

An important advance in aircraft flight safety has been the development of warning systems such as a Terrain Awareness Warning System ("TAWS"). These warning systems analyze the flight parameters of the aircraft and the terrain surrounding the aircraft. Based on this analysis, these warning systems provide alerts to the flight crew concerning possible inadvertent collisions with terrain or other obstacles. Unless adjusted for various phases of flight, however, such as landing and take-off, the terrain alert settings for TAWS provide false alerts to the flight crew, often called nuisance alerts, that may cause the flight crew to ignore other alerts from the TAWS altogether.

For example, during the landing operation of the aircraft, the aircraft will follow a flight path that will eventually intersect the earth at the intended runway on which the aircraft is scheduled to land. In the landing operation, if the alert settings for TAWS are not compensated for the landing pattern, the TAWS may generate constant alerts. The constant generation of alerts during landing may be a nuisance due to the added stress and confusion the alerts may impose on the flight crew. Additionally, the nuisance alerts may overshadow other critical alerts in the cockpit. For this reason, some TAWS anticipate the landing of the aircraft and disable or desensitize alerts otherwise generated by the warning system within a predetermined range of the airport, such that the TAWS will not generate nuisance alerts during landing of the aircraft.

Although disabling or desensitizing of alerts generated by the TAWS during landing eliminates problems associated with the generation of "nuisance" alerts, determining when to disable the terrain alerts also presents several problems. Specifically, several airports are located in geographic areas that are in close proximity to either natural high elevation terrain such as mountains and/or manmade terrain such as skyscrapers. Premature disablement or desensitization of the TAWS alerts may disadvantageously eliminate terrain alerting protection from these features near the airport.

Furthermore, operating the TAWS in close proximity to the airport may also cause problems. Specifically, if the TAWS is operated conservatively and the alerts remain enabled in close proximity to the airport, the TAWS is more likely to give nuisance alerts, mistaking the aircraft trajectory intersection with the runway as requiring a terrain alert. As explained previously, in these instances the flight crew may become desensitized to the alert and associate the alert with the impending landing of the aircraft, instead of the terrain or structures surrounding the airport.

Various TAWS have been designed that attempt to detect when the aircraft is entering a landing procedure to allow the terrain alerts to be disabled or desensitized in a more timely and sophisticated manner. For example, some TAWS monitor the flaps and landing gear systems of the aircraft to determine if these systems are operating in a characteristic landing configuration. Other systems monitor the rate of descent and air speed of the aircraft to determine whether the aircraft is landing.

Although these systems are designed to determine when the aircraft is beginning a landing procedure, these systems may at times be unreliable. This is because some configurations of the flaps, landing gear, air speed, and rate of descent that may appear to be part of a landing procedure, are also configurations used in the normal flight of the aircraft. Additionally, use of flap and landing gear configurations as indications of landing may not result in the TAWS alerts disabled or desensitized in a timely fashion. Specifically, because the flight crew typically configures the flaps and landing gear, the timing of the configuration of the flaps and landing gear may be different for each landing. Thus, the terrain alerts of the TAWS may either remain enabled for too long and produce unwanted nuisance alerts during a portion of the landing procedure, or the TAWS terrain alerts may be disabled too early and not provide adequate protection from terrain near the airport.

Satellite-based navigational systems, such as GPS, which can track longitude, latitude, altitude, ground track, and ground speed, are becoming an important and reliable source of information for aircraft. A TAWS' Forward Looking Terrain Avoidance ("FLTA") function looks ahead of the aircraft during flight along and below the aircraft's lateral and vertical flight path to provide suitable alerts if a potential threat exists of the aircraft colliding or coming too close to terrain. The computation involves searching through a terrain database for terrain cells that are within the search area and violate the Required Terrain Clearance ("RTC"). The RTC is the value set by the Federal Aviation Administration as the permitted flight "floor" for various phases of aircraft flight. The RTC indicates the clearance distance from terrain below which the aircraft should not fly. Analyzing the search area and finding the cells in violation is expensive in both processor and memory resources.

The purpose of a TAWS FLTA function is to predict whether the aircraft is heading toward terrain that will cause the terrain clearance to be less than the clearance required by federal guidelines. The Federal Aviation Administration ("FAA") establishes minimum terrain clearance levels that must be maintained for safety. The precise minimum clearance levels required for any given situation depend upon the type of aircraft, flight pattern, and other factors. The FAA also determines minimum performance standards for TAWS equipment used by an aircraft. One example of FAA TAWS equipment standards may be found in the Technical Standard Order TSO-C151b issued in December, 2002 by the FAA.

TAWS have been developed that utilize the advantages of GPS to evaluate the proximity of the aircraft to an airport and the flight altitude of the aircraft above a landing runway to determine if the aircraft is entering a landing procedure. For example, if an aircraft approaches the runway within a predetermined distance range and within a predetermined altitude range, the TAWS will determine that the aircraft is entering a landing procedure. During the landing procedure, the TAWS creates a terrain floor or minimum alert altitude surrounding the runway. An example of a system describing and explaining the use of a terrain floor and tracking of aircraft position using a Global Positioning System ("GPS") may be found in U.S. Pat. No. 5,839,080, entitled "Terrain Awareness System." Use of a terrain floor for calculating and providing terrain alerts during both cruising and landing procedures is well know in the art. By adjusting the aircraft terrain clearance values during a landing procedure from the minimum clearance values required during aircraft cruising flight, nuisance alerts may be reduced.

To provide higher levels of safety during landing yet reduce nuisance alerts, accurate methods of identifying when landing procedures are initiated and accurately identifying an appropriate destination runway is desirable. U.S. Pat. No. 6,304,800, entitled "Methods, Apparatus and Computer Program Products for Automated Runway Selection" discloses a method of identifying a destination runway. Particularly because TAWS is a safety system, but for other reasons as well, processor speed and reduction in the number of calculations required to perform functions is desirable. Conventional TAWS require significant processor calculation times for identifying and confirming destination runways during landing procedures.

DISCLOSURE OF THE INVENTION

The present invention relates to methods, apparatus and a system for selecting a destination runway from among two or more candidate runways at a destination airport in a way that reduces the calculations required at crucial times during a landing procedure. The method primarily involves grouping at least two runways as at least one candidate airport, selecting a candidate airport as a destination airport, and selecting a runway as a destination runway from among the candidate runways.

The selection of the destination airport involves comparing the candidate airports with criteria such as whether the candidate airport is within a predetermined distance from the aircraft and whether the candidate airport is in front of the aircraft. Additional criteria may include selecting the candidate airport that is closest to the current position of the aircraft, and selecting the candidate airport for which the bearing angle for the aircraft is smallest.

The selection of the destination runway involves selecting, among the candidate runways at the destination airport, the runway which is closest to the current position of the aircraft and for which the distance from the aircraft to the runway is decreasing. Particular embodiments of the invention treat each end of the runway as a candidate runway. Terrain Awareness Warning Systems ("TAWS") can use the information provided by embodiments of the present system to calculate more sophisticated landing procedures to reduce nuisance alerts, thereby increasing the safety of landing procedures.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a system and method for selecting a destination runway from among two or more candidate runways at a destination airport. Particular embodiments of the invention have specific application in a Terrain Awareness Warning System ("TAWS") for use by an aircraft searching terrain elevation data to provide advance warning to a pilot that a risk of a collision exists.

The purpose of a Forward Looking Terrain Avoidance ("FLTA") system of an aircraft is to predict whether the aircraft is heading toward terrain that will cause the terrain clearance to be less than the clearance required by federal guidelines. The Federal Aviation Administration ("FAA") establishes minimum terrain clearance levels that must be maintained for safety. The precise minimum clearance levels required for any given situation depends upon the type of aircraft, flight pattern, and other factors. The FAA also determines minimum performance standards for TAWS equipment used by an aircraft. One example of FAA TAWS equipment standards may be found in the Technical Standard Order TSO-C151b issued in December, 2002 by the FAA.

Figure 1:
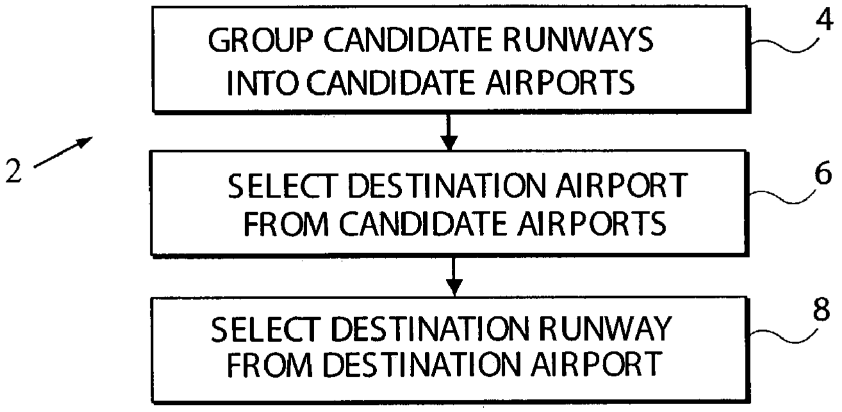
FIG. 1 is a simple flow chart illustrating a method of selecting a destination runway according to an embodiment of the present invention.

FIG. 1 illustrates a simple flow diagram for a method 2 of selecting a destination runway. The method involves: first, grouping candidate runways into candidate airport groups (Step 4); second, selecting a destination airport from among the candidate airport groups (Step 6); and third, selecting a destination runway from among the candidate runways of only the destination airport (Step 8). Examples of criteria for grouping, selecting a destination airport and selecting a destination runway are explained in more detail below. Ordinarily, a common database would include groupings of destination runways as destination airports rather than reconfiguring destination airports for each aircraft. The present invention may incorporate a database that includes appropriate data for airports and runways associated with those airports.

One way in which methods of the present invention reduce the number of calculations required during crucial periods, and thus the clock cycles used by safety systems, is to group candidate runways into candidate airport groups for a portion of the calculations and select a smaller group of candidate runways from which to choose when the aircraft is closer to the runway. By making this pre-selection of a candidate airport, fewer calculations are needed during landing procedures. If the candidate runways are not already grouped into candidate airports in a database associated with the system, such as by geographic location, business association, or convention in the airline industry, candidate runways may be grouped into candidate airports by any number of methods. For example, many cities have a number of airports and each airport has a number of runways known to be associated with the airport. Use of this convention will simplify understanding and organization of the selection process, but is not necessary. Nevertheless, merely dividing the runways into candidate airport groups and pre-selecting a destination airport, by any method, allows for fewer calculations at crucial times. Optimally, the candidate runways will be grouped into candidate airports for selection processes by the convention already established in the Industry as part of creating a runway information database.

Figure 2:
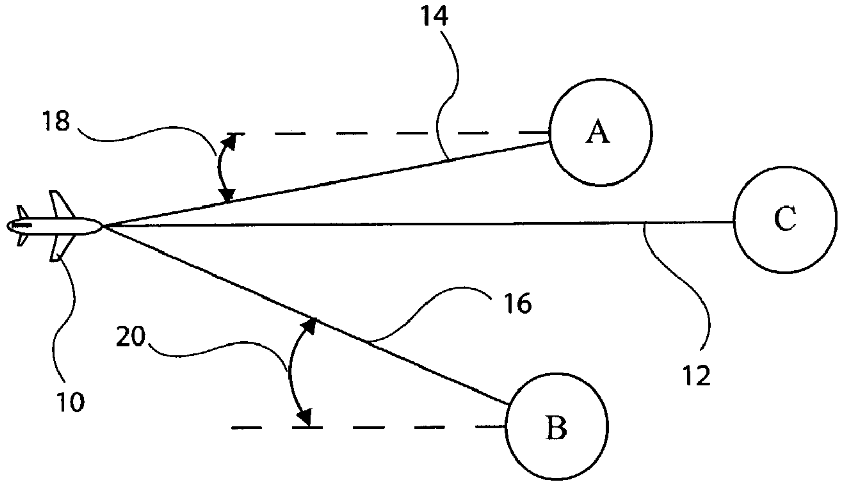
FIG. 2 is an overview representation of an aircraft approaching candidate airports.

As illustrated in FIG. 2, once the candidate runways are grouped into candidate airports (Step 4), shown in FIG. 2 as candidate airports A, B and C, a destination airport may be selected from among the candidate airports A, B and C. As used herein, a "destination airport" is an airport that meets the criteria necessary to indicate that the destination airport is the airport for which it is most likely that the aircraft will land. The identity of the destination airport may be input into and identified by the flight plan recorded for the aircraft. If a destination airport is identifiable from the flight plan and may be communicated to the TAWS system, the criteria for selecting the destination airport from among any number of candidate airports is that the airport is identified as the destination airport. For cases where a destination airport has not been put into the system or is not accessible by the system, and in cases where the destination airport changes enroute, additional criteria may be used. To the extent it is available, however, the data available in the system, such as through the flight plan data, is used.

In a particular embodiment of the invention, a destination airport is selected based upon the following criteria: first, the candidate airport is within a predetermined distance from the aircraft; second, the candidate airport is in front of the aircraft; and third, the distance between the aircraft and the candidate airport is decreasing. If these criteria have not narrowed the candidate airports list down to a single destination airport, additional criteria may be applied such as the candidate airport is the closest candidate airport to the aircraft, and the aircraft bearing angle to the candidate airport is the smallest. As illustrated in FIG. 2 and explained in the following example, this set of criteria will be enough to select a destination airport prior to arriving at the airport.

With reference to FIG. 2, the following is an example of how the criteria identified in the preceding paragraph may be applied to determining which of a number of candidate airports A, B or C is the destination airport for an aircraft 10 approaching the airports. First, only candidate airports within a predetermined distance from the aircraft are considered in the evaluation. Fewer calculations are required and irrelevant calculations are not performed by narrowing the maximum search range to an amount within which a calculation would be necessary if a landing were to take place such as, by example only, 15 nautical miles (nm). For purposes of this example, each of candidate airports A, B and C of FIG. 2 are within the predetermined distance of 15 nm from the aircraft.

Second, only candidate airports in front of the aircraft are considered in the evaluation. This means that the candidate airports are within the 180 degree field of view in front of the aircraft. Whether a candidate airport A, B or C is in front of the aircraft 10 may be determined by confirming that the absolute value of the difference between the aircraft's ground track and the bearing angle between the current position of the aircraft and the candidate airport is less than 90 degrees. This can also be determined by measuring whether the distance between the aircraft and the candidate airport is decreasing. In particular embodiments of the invention, rather than merely selecting those candidate airports in front of the aircraft, only candidate airports that are within a 120 degree field of view directly in front of the aircraft are selected. This is determined by confirming that the absolute value of the difference between the aircraft's ground track and the bearing angle between the current position of the aircraft and the candidate airport is less than 60 degrees. In other particular embodiments of the invention, only candidate airports which are within a 60 degree field of view directly in front of the aircraft are selected. This is determined by confirming that the absolute value of the difference between the aircraft's ground track and the bearing angle between the current position of the aircraft and the candidate airport is less than 30 degrees. By using a smaller range in front of the aircraft to evaluate for candidate airports, many other less likely airports within the area are removed from the comparison, thus further decreasing the required calculations. For many cases where airports are separated by a large enough distance, or the aircraft has passed by a candidate airport, these initial two criteria (distance and bearing angle) will be enough to select a destination airport.

For instances where application of the initial two criteria do not result in selection of a destination airport, an additional comparison may be performed involving both the distance to the candidate airport and the bearing angle to further narrow the range of choices. If the first two criteria do result in selection of a destination airport, the remaining criteria will be inherently met. As between any remaining candidate airports A, B and C, the following calculation is made for each:

$$X = \frac{\text{Range to Airport}}{\text{Threshold Range}} + \frac{\text{Bearing Angle to Airport}}{\text{Threshold Angle}}.$$

The Threshold Range is the predetermined distance used in the first calculation to determine whether a candidate airport is close enough to be considered; in that example, 15 nm. The Threshold Angle is the predetermined angle used in the second calculation to determine whether the candidate airport is in front of the aircraft and how close to directly in front of the aircraft the candidate airport is positioned; in the examples provided, either 90, 60 or 30 degrees. As a result of using these numbers, the maximum value of X is 2. A comparison is made for the value of X for each candidate airport remaining after the first two criteria are applied, and the candidate airport with the smallest value of X is selected as the destination airport.

In the example shown in FIG. 2, for example, we will presume that candidate airport A is at 12 nm and 10 degrees, candidate airport B is at 12 nm and 24 degrees, and candidate airport C is at 15 nm and 0 degrees. Using an example where the Threshold Range is 15 nm and the Threshold Angle is 30 degrees, XA=1.13, XB=1.6, and XC=1.0. Accordingly, candidate airport C is selected as the destination airport for this example. Once a destination airport is selected from among the candidate airports (Step 6, FIG. 1), a destination runway is selected from among the candidate runways at the destination airport (Step 8, FIG. 1).

For a conventional system, bearing angle, glideslope, distance, relative altitude, and the like, are determined for each different runway on each iteration to select a destination runway. This is particularly difficult and requires significant resources to determine because the relative bearing angles, distances, glideslopes, relative altitudes, etc. for the runways are all very similar within a particular airport, or even within closely positioned neighboring airports. Accordingly, the calculation results will also be very similar and difficult to distinguish between. By first determining a destination airport and using other calculations to select only from the candidate runways within that airport, methods of the present invention more efficiently use resources and enable the use of fewer calculations during pertinent safety times.

Figure 3:
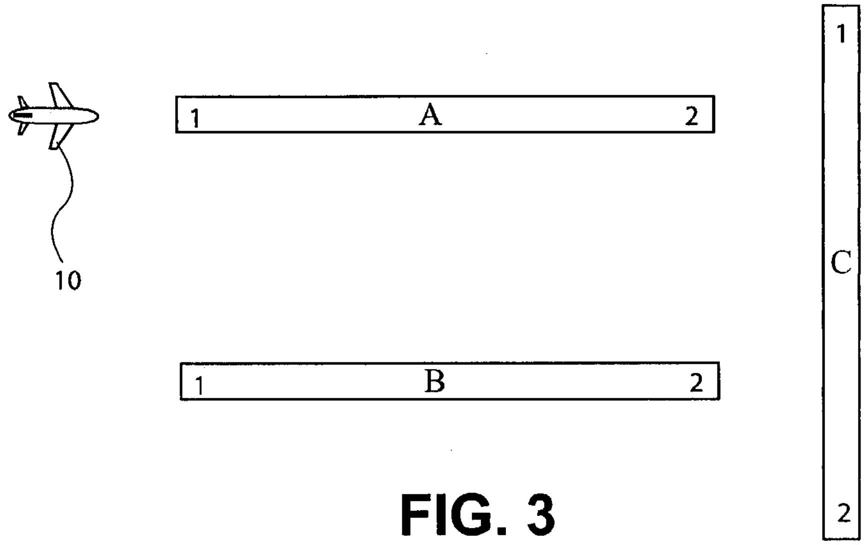
FIG. 3 is an overview representation of an aircraft approaching candidate runways.

When a destination airport is identified, the aircraft is still some distance from the airport and no change is yet required in the TAWS alerts to compensate for a particular landing pattern. There is still sufficient time to select a destination runway. FIG. 3 illustrates the same aircraft 10 approaching a number of candidate runways of a destination airport. It will be clear to those of ordinary skill in the art that particular airports may have only a single runway. In such cases, the choice as to which candidate runway is to be selected from the destination airport will be clear. By first narrowing the selection down to a particular airport, however, methods of the present invention are still an improvement over conventional systems.

Runways of an airport are conventionally laid out in some organized pattern such as a grid, in parallel lines, in a triangle, in a radial array pattern, or in some other organized pattern or shape. Determination of the destination runway for evaluating the landing distances and adjusting the TAWS alerts may be accomplished by selecting the candidate runway A, B or C which is closest to the current position of the aircraft 10 and, in particular embodiments, only those candidate runways A, B or C for which the distance from the aircraft to the runway is decreasing. In the example shown in FIG. 3, the destination runway is runway A.

Prior to and including selecting a destination runway, the calculations can be performed and values compared using only two-dimensional relationships. This also significantly simplifies the calculations required to select a destination runway in contrast to conventional methods. Once the specific destination runway is determined, however, the distance to the runway is calculated and stored, and the altitude of the aircraft in relation to the destination runway, i.e. the vertical distance above the runway, is calculated. The position of the destination runway relative to the aircraft is utilized by the TAWS for comparison with the current position of the plane to calculate a landing procedure.

If a particular destination airport is not previously identified within the flight computer, such as through the pilot's filing a flight plan or the aircraft is being navigated significantly contrary to the flight plan, calculations are continuously made to identify a destination airport. Even after a destination airport and a destination runway are identified in a calculation iteration, during a subsequent calculation iteration the destination airport and destination runway are again calculated and identified. This repetition of calculations ensures that the correct destination airport and destination runway are identified for use in the immediate TAWS alerts and warnings. As will be clear to those of ordinary skill in the art, however, because the levels of calculations performed by the present system are significantly simplified as compared to conventional systems, the calculations will be much quicker and require fewer system resources during crucial times.

The reduced terrain clearance values used for calculating the TAWS alerts and warnings are based upon the TSO guidelines generated by the FAA. These values vary depending upon the flight phase of the aircraft. For example, in a flight phase, where the aircraft is enroute to its destination over a predetermined altitude such as 3500 ft (feet), the minimum clearance level for flying straight may be 700 ft and may be 500 ft if the aircraft is descending. In a terminal phase, where the aircraft is preparing to land, such as having an altitude less than 3500 ft and within 15 nm of the airport, smaller reduced terrain clearance values may be used such as 350 ft clearance for level flight and 300 ft clearance for descending. On an approach phase, where the aircraft is descending to a specific runway, such as having an altitude of 1900 ft or less and within 5 nm of the airport, even smaller reduced terrain clearance values may be used. More complex analyses and divisions of relative altitudes, distances and reduced terrain clearance values may be used as necessary or desired for a particular application. These values are given only for example and may be any values determined by the FAA or modified to meet other requirements or desires.

Once a destination runway is determined during a calculation iteration, a determination is made as to the flight phase of the aircraft to determine which set of reduced terrain clearance ("RTC") values should be used for the TAWS alerts and warnings. If the aircraft is still above 3500 feet within 15 nm of the airport, there is no need to change the RTC values. If, however, the aircraft is below 1900 ft within 5 nm of the destination runway, it is presumed that the aircraft is landing and RTC values are adjusted accordingly.

FIG. 3 also illustrates a second aspect of runway selection according to particular methods of the present invention. In some airports, either the first or second end of the runway may be used for landing the aircraft. The candidate runways A, B and C of FIG. 3 are each labeled with ends 1 and 2. In particular methods of selecting a candidate runway, each end of each runway is identified and treated as a candidate runway; the data relating to each respective end being stored in the runway database which includes at least the end's latitude, longitude and elevation. By doing this, the aircraft's current position relative to a particular end of the runway may be calculated and used in determining a destination runway. It should be understood, however, that due to the conditions of the runway on one end or the other, it may be that only one end of the runway is usable for landing. One other particular benefit of distinguishing between the runway ends in identifying a destination runway is that for many airports the first and second ends of the runway are not at the same elevation. In a conventional database, if there is no distinction between the first and second ends of the runway, having first and second ends at different elevations but only a single elevation value stored in the database would require that an average value be stored, or that the value for either one or the other end be stored to represent the entire runway. This, and the lack of a specific position for the end of the destination runway may result in erroneous in calculations, warnings or landing procedures. By specifically identifying each end of the runway as a candidate runway with its own distance from the aircraft, position and elevation, more accurate indications of which end of the runway is the destination runway can be made resulting in improved safety. Additionally, the distance and height above the runway to be used in determining the flight phase and TAWS alerts will be more accurate by treating each end of the runway as a separate candidate runway because some runways have an elevation difference of hundreds of feet between the two ends.

Figure 4:
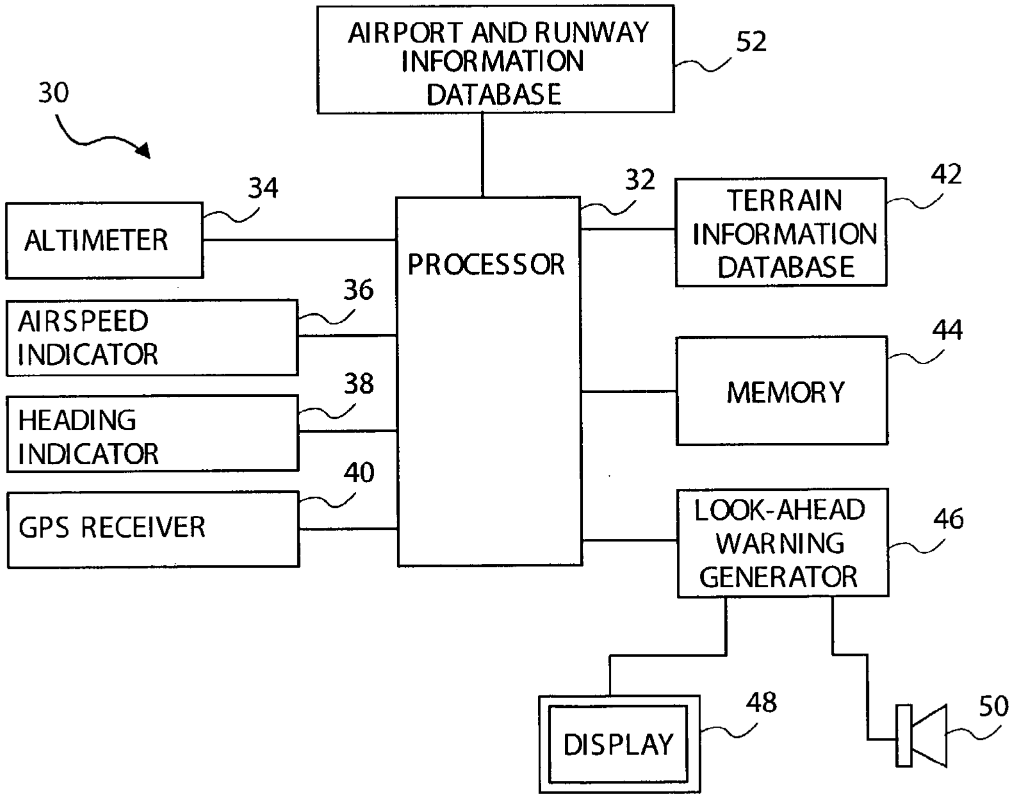
FIG. 4 is a system diagram of a TAWS configured according to an embodiment of the present invention.

FIG. 4 is a block diagram of a TAWS 30 for an aircraft configured according to an embodiment of the present invention. TAWS systems generally, their components and conventional avionics equipment are well known in the art and are governed by TSOs issued by the FAA. TAWS using satellite navigation information are also well known to those of ordinary skill in the art. The TAWS 30 of FIG. 4 includes a plurality of inputs to a central processor 32 where algorithms for methods of the present invention are executed. The central processor 32 may be a single processor with associated memory as is common in the art, or may be a plurality of processors associated with a number of different systems integral with or separate from the TAWS for performing all or a part of the processor function described herein. The inputs to the processor include signals from devices for collecting information relevant to the various calculations performed by the TAWS 30. Those inputs may include an altimeter 34, an airspeed indicator 36, a heading indicator 38 or ground tracker 38, and a GPS receiver 40, all of which are common to conventional TAWS and are well known in the art. Alternatively, the GPS receiver 40 may be used to provide altitude, airspeed and ground track indications.

The system 30 also includes a geographic terrain information database 42 that includes at least elevation data for the geographic area over which the aircraft may fly. The locations and elevations of respective candidate runways and airports are stored within the system 30 in an airport and runway information database 52, or an associated database or memory location 44, that may additionally be configured to include information regarding the terrain if a separate geographic terrain information database 42 is not available or desired. A look-ahead warning generator 46 evaluates the geographic locations identified as being of concern, and produces appropriate warnings by visual display 48 and/or aural warning 50. Visual display 48 may include display monitors, televisions, LED displays, blinking lights, digital and analog displays, and any other displays known for use with TAWS. Aural warnings 50 may include spoken recorded or synthesized voices, "beeps", or any other aural warnings known for use with TAWS.

Methods of the present invention for use with a TAWS system provide the indication of a destination runway and may further be configured to provide the specific location, elevation, and the like, for the destination runway for use by the TAWS in providing appropriate warnings. Those of ordinary skill in the art will be able to select an appropriate landing pattern, clearance altitudes, and safety warnings based upon FAA guidelines.

The embodiments and examples set forth herein were presented to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of selecting a destination runway upon which an aircraft is most likely to land, the method comprising:

grouping at least two runways as at least one candidate airport;

selecting one candidate airport as a destination airport;

selecting one runway of the at least two runways from the destination airport as the destination runway; and calculating a value of X for each candidate airport, the value of X being dependant at least upon— a ratio of the distance from the aircraft to the candidate airport and a threshold range, and a ratio of a bearing angle of the aircraft to the candidate airport and a threshold angle.

2. The method of claim 1, wherein grouping at least two runways as at least one candidate airport comprises associating the at least two runways in a database as belonging to the candidate airport based upon geographic position.

3. The method of claim 1, wherein grouping at least two runways as at least one candidate airport comprises associating the at least two runways in a database as belonging to the candidate airport based upon an identifier indicating the at least two runways are associated with the candidate airport.

4. The method of claim 1, wherein selecting the destination airport comprises selecting as the destination airport the candidate airport:

which is in front of the aircraft; and which is at a distance from the aircraft less than a predetermined distance.

5. The method of claim 4, wherein selecting the candidate airport which is in front of the aircraft comprises selecting the candidate airport for which the absolute value of the aircraft bearing angle to the candidate airport is less than approximately 60 degrees.

6. The method of claim 4, wherein selecting the candidate airport which is in front of the aircraft comprises selecting the candidate airport for which the absolute value of a bearing angle of the aircraft to the candidate airport is less than approximately 30 degrees.

7. The method of claim 1, wherein the first ratio is the distance from the aircraft to the candidate airport over the threshold range and the second ratio is the bearing angle of the aircraft to the candidate airport over the threshold angle.

8. The method of claim 7, wherein X equals a sum of the ratios, the method further comprising selecting as the destination airport the candidate airport for which the value X is smallest.

9. The method of claim 1, further comprising selecting the candidate runway based upon its distance from the aircraft.

10. The method of claim 1, wherein a plurality of candidate runways each represent one of two ends of an aircraft runway.

11. The method of claim 10, wherein selecting the destination runway comprises selecting as the destination runway the candidate runway representing the aircraft runway end which is closest to a current position of the aircraft.

12. The method of claim 11, further comprising selecting as the destination runway the candidate runway representing the aircraft runway end for which a distance between the end of the aircraft runway and the aircraft is decreasing.

13. A terrain awareness and warning system (TAWS) for an aircraft, the TAWS comprising:

at least one information database configured to store elevation and position information for a terrain region, at least one candidate airport and at least two candidate runways within each candidate airport;

a look-ahead warning generator configured to receive indications of terrain clearance alerts and communicate the indications by at least one of a visual display and an aural warning; and a processor coupled to the information database and the look-ahead warning generator, the processor configured to employ aircraft landing approach warning values upon receiving an indication that a destination runway has been selected, wherein the processor is configured to identify a potential destination runway by identifying the at least two candidate runways from the information database as at least one candidate airport, selecting one candidate airport from the information database as a destination airport, and selecting one candidate runway of the at least two candidate runways from the destination airport as the destination runway, wherein the processor is further configured to select the destination airport based upon a fourth criteria which is that a value for X is smallest, wherein the value of X for each candidate airport is dependent at least upon a sum of a first ratio of the distance from the aircraft to the candidate airport and a threshold range, and a second ratio of a bearing angle of the aircraft to the candidate airport and a threshold angle.

14. The TAWS of claim 13, wherein the processor is further configured to select the destination airport based upon at least the first criteria of the airport being in front of the aircraft and the second criteria that the distance between the aircraft and the candidate airport is less than a predetermined distance.

15. The TAWS of claim 14, wherein the processor is further configured to select the destination airport based upon a third criteria that an absolute value of the aircraft bearing angle to the candidate airport is less than approximately 60 degrees.

16. The TAWS of claim 14, wherein the processor is further configured to select the destination airport based upon a third criteria that an absolute value of the aircraft bearing angle to the candidate airport is less than approximately 30 degrees.

17. The TAWS of claim 14, wherein the first ratio is the distance from the aircraft to the candidate airport over the threshold range and the second ratio is the bearing angle of the aircraft to the candidate airport over the threshold angle.

18. The TAWS of claim 13, wherein the processor is further configured to select the destination runway solely based upon a distance calculation between each candidate runway and the current position of the aircraft.

19. The TAWS of claim 13, wherein the processor is further configured to distinguish between first and second ends of a plurality of aircraft runway and treat each as a candidate runway.

20. The TAWS of claim 19, wherein the processor is further configured to select the destination runway based upon the criteria that the destination runway is the aircraft runway end that is closest to a current position of the aircraft.

21. The TAWS of claim 20, wherein the processor is further configured to select the destination runway based solely upon a distance calculation between each aircraft runway end and the current position of the aircraft.

22. The TAWS of claim 13, wherein the processor is further configured to select the destination runway based upon the criteria that the destination runway is an end of the candidate runway for which a distance between the end of the candidate runway and the aircraft is decreasing.

23. The method of claim 1, wherein selecting the destination airport is based at least in part on a distance ratio to the candidate airport.

24. The TAWS of claim 13, wherein selecting the destination airport is based at least in part on a distance ratio to the candidate airport.

25. A method of selecting a destination runway upon which an aircraft is most likely to land, the method comprising:

- grouping at least two runways as at least one candidate airport;
- selecting one candidate airport as a destination airport; and
- selecting one runway of the at least two runways from the destination airport as the destination runway, wherein selecting the destination runway comprises selecting a candidate runway having an aircraft runway end for which a distance between the end of the aircraft runway and the aircraft is decreasing.

26. A terrain awareness and warning system (TAWS) for an aircraft, the TAWS comprising:

- at least one information database configured to store elevation and position information for a terrain region, at least one candidate airport and at least two candidate runways within each candidate airport;
- a look-ahead warning generator configured to receive indications of terrain clearance alerts and communicate the indications by at least one of a visual display and an aural warning; and
- a processor coupled to the information database and the look-ahead warning generator, the processor configured to employ aircraft landing approach warning values upon receiving an indication that a destination runway has been selected, wherein the processor is configured to identify a potential destination runway by identifying the at least two candidate runways from the information database as at least one candidate airport, selecting one candidate airport from the information database as a destination airport, and selecting one candidate runway of the at least two candidate runways from the destination airport as the destination runway, wherein selecting the destination runway is based upon the criteria that the destination runway is an end of the candidate runway for which a distance between the end of the candidate runway and the aircraft is decreasing.

27. A method of selecting a destination runway upon which an aircraft is most likely to land, the method comprising:

- selecting one of a plurality of candidate airports, as a destination airport by—
  - calculating a value of X for each candidate airport, the value of X being dependant upon—
    - a first ratio of a distance from the aircraft to the candidate airport over a threshold range, and
    - a second ratio of a bearing angle of the aircraft to the candidate airport over a threshold angle, and
  - selecting as the destination airport, the candidate airport having the lowest value of X; and
- selecting one of a plurality of candidate runways of the destination airport, with each candidate runway having at least one runway end, as the destination runway, based solely on distance calculations, by—
  - monitoring over time, a distance between the aircraft and the runway end, for each runway end, and
  - selecting as the destination runway the candidate runway for which the distance is smallest and decreasing.

* * * * *